United States Patent
Mori et al.

(10) Patent No.: US 8,090,226 B2
(45) Date of Patent: Jan. 3, 2012

(54) OPTICAL WAVEGUIDE DEVICE AND METHOD FOR SUPPRESSING TEMPERATURE CROSSTALK OF OPTICAL WAVEGUIDE DEVICE

(75) Inventors: Shingo Mori, Chiyoda-ku (JP); Tsutomu Saitou, Chiyoda-ku (JP); Toru Sugamata, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 219 days.

(21) Appl. No.: 12/450,328

(22) PCT Filed: Mar. 27, 2008

(86) PCT No.: PCT/JP2008/055904
§ 371 (c)(1),
(2), (4) Date: Oct. 7, 2009

(87) PCT Pub. No.: WO2008/120676
PCT Pub. Date: Sep. 10, 2008

(65) Prior Publication Data
US 2010/0111463 A1   May 6, 2010

(30) Foreign Application Priority Data
Mar. 29, 2007   (JP) .................. 2007-087646

(51) Int. Cl.
*G02F 1/035* (2006.01)
(52) U.S. Cl. .................. 385/2; 385/1; 385/14; 385/130; 385/131
(58) Field of Classification Search .................. 385/1, 2, 385/3, 14, 24, 129, 130, 131, 132; 356/450, 356/460
See application file for complete search history.

(56) References Cited

U.S. PATENT DOCUMENTS

| 5,408,566 A | 4/1995 | Eda et al. |
| 6,408,111 B1 * | 6/2002 | Doerr et al. ............. 385/3 |
| 6,470,125 B1 * | 10/2002 | Nashimoto et al. ......... 385/122 |

(Continued)

FOREIGN PATENT DOCUMENTS
CN   1621893 A   6/2005
(Continued)

OTHER PUBLICATIONS

International Preliminary Report on Patentability issued in Application No. PCT/JP2008/055904 on Oct. 20, 2009.

(Continued)

*Primary Examiner* — Brian Healy
(74) *Attorney, Agent, or Firm* — Oliff & Berridge, PLC

(57) ABSTRACT

An optical waveguide device includes: a substrate having an electro-optical effect; an optical waveguide section formed on the substrate; and a plurality of modulating electrodes for modulating optical waves propagating in the optical waveguide section. The optical waveguide section branches into two parts in the propagating direction of the optical waves, thus forming the two main optical waveguides, and each of the main optical waveguides branches into two parts in the propagating direction of the optical waves, thus forming the two sub optical waveguides. The two main optical waveguides constitute a main Mach-Zehnder type optical waveguide, and the two sub optical waveguides are incorporated into the main Mach-Zehnder type optical waveguide to constitute a sub Mach-Zehnder type optical waveguide. A heat conduction suppressing zone is defined on a portion of the substrate disposed between two opposite sub Mach-Zehnder type optical waveguides.

10 Claims, 2 Drawing Sheets

U.S. PATENT DOCUMENTS

| | | | |
|---|---|---|---|
| 6,925,217 B2 * | 8/2005 | Yamazaki et al. | 385/14 |
| 6,944,366 B2 * | 9/2005 | Aksyuk et al. | 385/18 |
| 7,228,019 B2 | 6/2007 | Takahashi | 385/14 |
| 7,245,787 B2 | 7/2007 | Kawanishi et al. | |
| 7,565,038 B2 * | 7/2009 | Earnshaw | 385/1 |
| 2005/0111778 A1 * | 5/2005 | Takahashi | 385/14 |
| 2005/0213862 A1 | 9/2005 | Kawanishi et al. | |
| 2010/0111463 A1 * | 5/2010 | Mori et al. | 385/2 |

FOREIGN PATENT DOCUMENTS

| | | |
|---|---|---|
| EP | 1 536 275 A1 | 6/2005 |
| JP | A-01-158413 | 6/1989 |
| JP | A-06-289341 | 10/1994 |
| JP | A-2003-228031 | 8/2003 |
| JP | A-2005-265959 | 9/2005 |
| JP | B2-3867148 | 1/2007 |

OTHER PUBLICATIONS

Sep. 1, 2010 Office Action in Chinese Application No. 200880010817.X (with brief English translation).

* cited by examiner

OPTICAL WAVEGUIDE DEVICE AND METHOD FOR SUPPRESSING TEMPERATURE CROSSTALK OF OPTICAL WAVEGUIDE DEVICE

TECHNICAL FIELD

The present invention relates to an optical waveguide device, and more particularly, to an optical waveguide device having a so-called nested waveguide structure where two sub Mach-Zehnder optical waveguides thereof are incorporated into a main Mach-Zehnder optical waveguide thereof.

BACKGROUND ART

An optical modulating method for applying identical modulating signals having a predetermined phase difference (i.e., time delay) into a plurality of modulating electrodes, such as a SSB (Single-Side band) modulating method, a duobinary modulating method, or the like, has been conventionally utilized in the field of optical communication or optical measurement.

The SSB-type optical modulator typically use an optical waveguide device having a so-called nested waveguide structure with a double nested Mach-Zehnder type optical waveguide where two sub Mach-Zehnder type optical waveguides are incorporated into the branch waveguides of a main Mach-Zehnder type optical waveguide thereof. In such an optical waveguide device, in order to obtain the SSB modulating signals, two split modulating signals are processed to have a phase difference of 90° by a 90° hybrid and are applied to the modulating electrodes of the respective sub Mach-Zehnder type optical waveguides, respectively (see Patent Reference 1).
Patent Reference 1: JP-B2 3867148
Patent Reference 2: JP-A 6-289341

A dual-electrode Mach-Zehnder type optical modulator is used for the duobinary modulating method, whereby the modulating signals respectively applied to the modulating electrodes of the two branch waveguides are configured to have a predetermined bit difference therebetween by using a bit delay circuit. A bit delay is generally selected from the range of 0 to 2 T (T=1 bit).

However, in the optical waveguide device having the nested waveguide structure used for the SSB modulating method, particularly, a bias point, that is, an operating point, of each sub Mach-Zehnder type optical waveguide is frequently shifted under operation, and thus, there is a problem that it is difficult to ensure a stable operation.

In order to suppress such an operating point shift, an output signal from the optical waveguide device is appropriately monitored by a light detecting unit, and when an operating point shift occurs, the shift is appropriately corrected by using a controller or the like. However, the operation for adjustment of the operating point is extremely complex, which makes it difficult to put the optical waveguide device having the nested waveguide structure into practical use.

DISCLOSURE ON INVENTION

It is an object of the present invention is to provide an optical waveguide device having a nested waveguide structure, capable of suppressing an operating point shift without requiring any controller or the like.

According to an aspect of the invention, there is provided an optical waveguide device including: a substrate having an electro-optical effect; an optical waveguide section formed on the substrate; and a plurality of modulating electrodes for modulating optical waves propagating in the optical waveguide section, wherein the optical waveguide section branches into two parts in a propagating direction of an optical wave, thus forming two main optical waveguides, and each of the main optical waveguides branches into two parts in the propagating direction of the optical waves, thus forming two sub optical waveguides; wherein the two main optical waveguides constitute a main Mach-Zehnder type optical waveguide, and the two sub optical waveguides are incorporated into the main Mach-Zehnder type optical waveguide to constitute a sub Mach-Zehnder type optical waveguide so that a heat conduction suppressing zone is defined on a portion of the substrate disposed between two opposite sub Mach-Zehnder type optical waveguides.

According to another aspect of the invention, there is provided a method for suppressing the temperature crosstalk of an optical waveguide device, the optical waveguide device including: a substrate having an electro-optical effect; an optical waveguide section formed on the substrate; and a plurality of modulating electrodes for modulating optical waves propagating in the optical waveguide section, wherein the optical waveguide section branches into two parts in a propagating direction of an optical wave, thus forming the two main optical waveguides, and each of the main optical waveguides branches into two parts in the propagating direction of the optical waves, thus forming the two sub optical waveguides; and the two main optical waveguides constitute a main Mach-Zehnder type optical waveguide, and the two sub optical waveguides are incorporated into the main Mach-Zehnder type optical waveguide to constitute a sub Mach-Zehnder type optical waveguide, the method including: defining a heat conduction suppressing zone on a portion of the substrate disposed between the two opposite sub Mach-Zehnder type optical waveguides; and suppressing a occurrence of a temperature crosstalk between the two opposite sub Mach-Zehnder type optical waveguides.

The present inventors have conducted vigorous studies in order to achieve the above-mentioned objects. As a result, they have come to the following findings. In the above-described optical waveguide device having the nested waveguide structure, the sub Mach-Zehnder type optical waveguides may generate heat due to the modulation or the like and may cause thermal interference. That is to say, the first sub Mach-Zehnder type optical waveguide and the second sub Mach-Zehnder type optical waveguide are heated under operation, but their actual temperatures are different depending on various conditions such as their arrangement positions or the ambient temperature.

Therefore, from one of the sub Mach-Zehnder type optical waveguides, thermal transport occurs toward a neighboring area where temperature is low, however, this thermal transport affect the other sub Mach-Zehnder type optical waveguide adjacent thereto. For example, if the temperature of the first sub Mach-Zehnder type optical waveguide is higher than the temperature of the second sub Mach-Zehnder type optical waveguide, thermal transport may occur from the first sub Mach-Zehnder type optical waveguide to the second sub Mach-Zehnder type optical waveguide. Moreover, the degree of this thermal transport will vary frequently depending on the use environment or the use state.

That is to say, a temperature crosstalk occurs between the first sub Mach-Zehnder type optical waveguide and the second sub Mach-Zehnder type optical waveguide, and thus, the temperature crosstalk will affect the characteristics of the second sub Mach-Zehnder type optical waveguide, such as an operating point shift. As a result, the operating point shift will frequently occur in the whole optical waveguide device.

Therefore, in the present invention, in order to solve such problems, a heat conduction suppressing zone is formed on a portion of the substrate constituting the optical waveguide device between the two opposite sub Mach-Zehnder type optical waveguides so that the occurrence of the temperature crosstalk between the two sub Mach-Zehnder type optical waveguides is suppressed. Therefore, it is possible to effectively suppress a characteristic change due to the temperature, such as an operating point shifts, of the sub Mach-Zehnder type optical waveguides, and thus, to effectively suppress the characteristic change due to the temperature, such as an operating point shift, in the whole of the optical waveguide device.

Specifically, the "temperature crosstalk" refers to a drift amount (hereinafter, referred to as a thermal drift) caused by heat generated when an RF signal is applied to the electrodes. The drift amount is typically represented by a driving voltage, and the drift amount is generally evaluated, in terms of DC voltage. It is considered to be good when the driving voltage is 0.5 V or smaller and to not be good when it is larger than 0.5 V.

The optical waveguide device according to an embodiment of the present invention may have a configuration such that the heat conduction suppressing zone is a trench formed inside the substrate. In this case, since a heat insulating air layer is formed between the two sub Mach-Zehnder type optical waveguides, it is possible to effectively suppress thermal interference between these optical waveguides, that is, the temperature crosstalk. The trench may be formed so as to penetrate through the substrate, or may be formed into a recessed portion without penetrating through the substrate.

The optical waveguide device according to another embodiment of the present invention may have a configuration such that the heat conduction suppressing zone is a heat insulating member which is filled in the trench formed inside the substrate. In this case, the thermal interference between the two sub Mach-Zehnder type optical waveguides, that is, the temperature crosstalk can be effectively suppressed by the heat insulating member. The heat insulating member is preferably formed of a thermo-setting resin such as a phenol resin, an epoxy resin, a melamine resin, a unsaturated polyester resin, or the like; however, it does not exclude the use of other resins such as, for example, a thermoplastic resin.

The optical waveguide device according to a further embodiment of the present invention may have a configuration such that the heat conduction suppressing zone is configured by a metal plate. In this case, since the metal plate functions as a heat sink, the metal plate can effectively absorb and dissipate the heat generated between the two sub Mach-Zehnder type optical waveguides. By doing so, it is possible to effectively suppress the thermal interference between the two sub Mach-Zehnder type optical waveguides, that is, temperature crosstalk.

The metal plate may be configured by at least one modulating electrode of the plurality of modulating electrodes, located between the two opposite sub Mach-Zehnder type optical waveguides. In this case, since it is possible to omit the additional step for producing the metal plate, it is possible to simplify the manufacturing process of the optical waveguide device.

In this case, the distance between the two sub Mach-Zehnder type optical waveguides is preferably in the range of 0.1 mm to 0.8 mm. By doing so, the above-described effects can be obtained more successfully.

EFFECT OF THE INVENTION

As described above, according to the aspects and embodiments of the present invention, it is possible to effectively suppress the temperature crosstalk between the two subMach-Zehnder type optical waveguides constituting the optical waveguide device. Therefore, it is possible to provide an optical waveguide device having a nested waveguide structure, capable of suppressing an operating point shift without requiring any controller or the like.

BEST MODE FOR CARRYING OUT THE INVENTION

In the following, preferred embodiments of the present invention are described in detail with reference to the accompanying drawings.

First Embodiment

Figure 1:
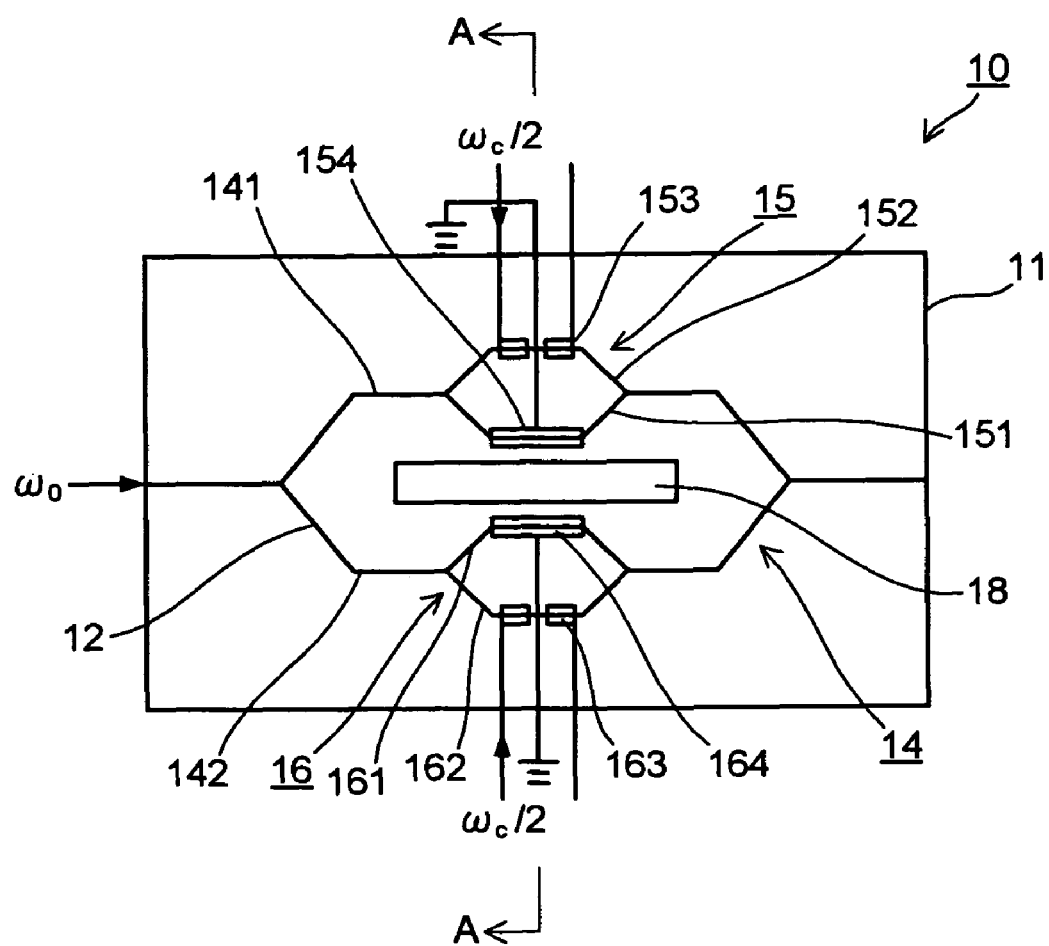
FIG. 1 is a top plan view illustrating the structure of an optical waveguide device according to a first embodiment of the present invention.
Figure 2:
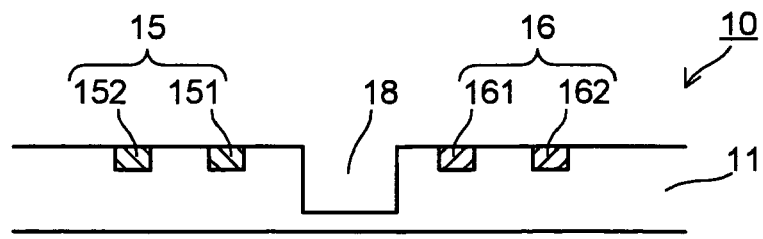
FIG. 2 is a cross-sectional view, along the A-A lines, of the optical waveguide device illustrated in FIG. 1.

FIG. 1 is a top plan view illustrating the structure of an optical waveguide device according to the first embodiment of the present invention, and FIG. 2 is a cross-sectional view of the optical waveguide device of FIG. 1, taken on the A-A lines. In FIGS. 2 to 5, modulating electrodes 153, 154, 163, and 164 are not illustrated.

An optical waveguide device 10 according to the present embodiment is provided with a substrate 11 having an electro-optical effect and an optical waveguide section 12 formed on a top surface portion of the substrate 11. The optical waveguide section 12 branches into two parts in the propagating direction of the optical waves, thus forming two main optical waveguides 141 and 142. The main optical waveguides 141 and 142 branch into corresponding two parts in the propagating direction of the optical waves, thus forming two sub optical waveguides 151 and 152, and 161 and 162, respectively.

The two main optical waveguides 141 and 142 constitute a main Mach-Zehnder type optical waveguide 14. Moreover, the two sub optical waveguides 151 and 152 constitute a first sub Mach-Zehnder type optical waveguide 15, and the two sub optical waveguides 161 and 162 constitute a second sub Mach-Zehnder type optical waveguide 16. As a result, the two sub Mach-Zehnder type optical waveguides 15 and 16 have such a structure that they are incorporated into the main Mach-Zehnder type optical waveguide 14.

Moreover, the sub optical waveguides 151 and 152 are provided with modulating electrodes 153 and 154, respectively, and the sub optical waveguides 161 and 162 are provided with modulating electrodes 163 and 164, respectively. In the present embodiment, the modulating electrodes 153 and 163 function as respective signal electrodes for applying corresponding predetermined modulating signals, and the modulating electrodes 154 and 164 function as respective ground electrodes. Specifically, the modulatiing electrode 153 is configured by a signal electrode and a DC electrode, and the modulating electrode 154 is configured as a ground electrode. Moreover, the modulating electrode 163 is configured by a signal electrode and a DC electrode, and the modulating electrode 164 is also configured as a ground electrode.

A heat conduction suppressing zone 18 is defined between the first sub Mach-Zehnder type optical waveguide 15 and the second sub Mach-Zehnder type optical waveguide 16. In the present embodiment, the heat conduction suppressing zone 18 is configured by a trench which is formed inside the substrate 11. In this case, since a heat insulating layer of air is formed between the two sub Mach-Zehnder type optical waveguides 15 and 16, it is possible to effectively suppress thermal interference between these optical waveguides, that is, temperature crosstalk. As a result, it is possible to effectively suppress the operating point shift due to the temperature crosstalk and other effects in the whole of the optical waveguide device 10.

Although the depth of the trench 18 is not particularly limited, it is preferably equal to or larger than the formation depth of the optical waveguides 151, 152, 161, and 162 formed inside the substrate 11; more preferably, the trench 18 penetrates through the substrate 11. Although the width of the trench 18 is not particularly limited, because the typical existing optical waveguide devices have a width dimension of the millimeter order, a width of the micrometer order can provide a sufficient heat-conduction suppressing effect.

The substrate 11 can be made of lithium niobate, lithium tantalite, PLZT (lead lanthanum zirconate titanate), or quartz-based material, or a combination of these materials, for example. It is particularly preferable to use crystals of lithium niobate (LN) or lithium tantalite (LT) due to their high electro-optical effect.

The optical waveguide section 12 (141, 142, 151, 152, 161, and 162) can be formed by diffusing Ti or the like into the surface of the substrate surface by a thermal diffusion method, a proton exchange method, or the like. The optical waveguide section 12 may be formed by forming a ridge structure on the surface of the substrate 11 so as to comply with the shape of the optical waveguides as described in Patent Reference 2.

The modulating electrodes 153, 154, 163, and 164 can be formed by the formation of a Ti—Au electrode pattern, a gold plating method or the like.

Although not illustrated, a buffer layer may be provided between the substrate 11 and the modulating electrodes 153, 154, 163, and 164. By doing so, it is possible to effectively prevent the optical waves propagating in the optical waveguides from being absorbed or scattered by the modulating electrodes. Moreover, it is possible to provide an improved degree of matching of the propagation speed between the modulating signals applied from the modulating electrodes and the optical waves propagating in the optical waveguides.

Next, an example of a modulating method of the optical waveguide device according to the present embodiment will be described. When a laser beam of a frequency $\omega_0$ is input into the optical waveguide device 10 as an input optical signal, the optical signal propagates through the optical waveguide section 12 and is then branched into the main optical waveguides 141 and 142 of the main Mach-Zehnder type optical waveguide 14. Thereafter, the optical wave propagated in the main optical waveguide 141 is branched into the sub optical waveguides 151 and 152 of the sub Mach-Zehnder type optical waveguide 15, where a modulating signal of frequency $\omega_c/2$ is applied thereto. Moreover, the optical wave having propagated through the main optical waveguide 142 is branched into the sub optical waveguides 161 and 162, where a modulating signal of $\omega_c/2$ is applied thereto.

As a result, when the optical waves modulated with the modulating signals of frequency $\omega_c/2$ are combined together to propagate in the optical waveguide section 12 to be output from the optical waveguide device 10, it is possible to obtain two optical signals $\omega_1$ and $\omega_2$ of which the frequencies are separated by $\omega_c$.

The described modulating method is only an example, and the optical waveguide device according to the present embodiment may be used in an arbitrary manner depending on its purpose of use.

Second Embodiment

Figure 3:
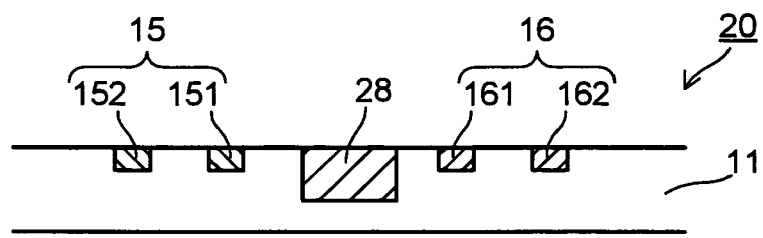
FIG. 3 is a cross-sectional view of an optical waveguide device according to a second embodiment.

FIG. 3 is a cross-sectional view of an optical waveguide device according to the second embodiment. The planar shape of the optical waveguide device of the present embodiment is identical to that in the first embodiment. FIG. 3 corresponds to FIG. 2 in the first embodiment, and is a cross-sectional view, taken on the A-A line, of the optical waveguide device. The same or similar components will be denoted by the same reference numerals.

The optical waveguide device 20 according to the present embodiment is different from that of the first embodiment, in that a heat insulating member 28 is filled in the trench; other components of the embodiments except this are completely the same, and the description thereof will be omitted.

As illustrated in FIG. 3, in the present embodiment, since the heat insulating member 28 is provided between the first sub Mach-Zehnder type optical waveguide 15 and the second sub Mach-Zehnder type optical waveguide 16, it is possible to effectively suppress the thermal interference between these optical waveguides, that is, temperature crosstalk. As a result, it is possible to effectively suppress the operating point shift due to the temperature crosstalk and other effects in the whole of the optical waveguide device 20.

The heat insulating member 28 preferably has its bottom portion formed to a depth equal to or larger than the formation depth of the optical waveguides 151, 152, 161, and 162 formed inside the substrate 11. The width of the heat insulating member 28 is not particularly limited. However, since the typical optical waveguide device has a width dimension of the millimeter order, the heat insulating member 28 with a width of the sub-micrometer order can provide a sufficient heat-conduction suppressing effect.

The heat insulating member 28 is preferably formed of a thermo-setting resin such as a phenol resin, an epoxy resin, a melamine resin, a unsaturated polyester resin, or the like; however, it does not exclude the use of other resins such as, for example, a thermoplastic resin.

Third Embodiment

Figure 4:
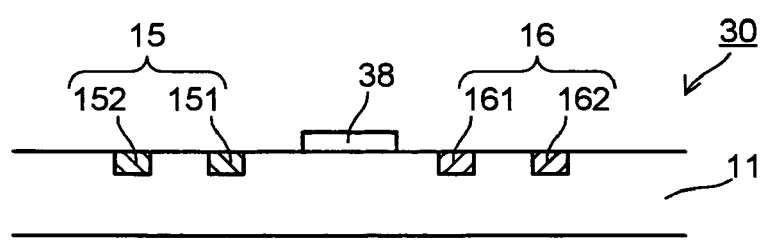
FIG. 4 is a cross-sectional view of an optical waveguide device according to a third embodiment.

FIG. 4 is a cross-sectional view of an optical waveguide device according to the third embodiment. The planar shape of the optical waveguide device of the present embodiment is identical to that in the first embodiment. FIG. 4 corresponds to FIG. 2 in the first embodiment, and is a cross-sectional view, taken on the A-A line, of the optical waveguide device. The same or similar components will be denoted by the same reference numerals.

The optical waveguide device 30 according to the present embodiment is different from that of the first embodiment, in that the heat conduction suppressing zone is configured differently; other components of the embodiments except this are completely the same, and the description thereof will be omitted.

As illustrated in FIG. 4, in the present embodiment, since a metal plate 38 is provided between the first subMach-Zehnder type optical waveguide 15 and the second sub Mach-Zehnder type optical waveguide 16, the metal plate 38 performs the function of a heat sink with respect to heat generated between these optical waveguides, and thus, it is possible to effectively suppress the thermal interference between these optical waveguides, that is, the temperature crosstalk. As a result, it is possible to effectively suppress the operating point shift due to the temperature crosstalk and other effects in the whole of the optical waveguide device 30.

The metal plate 38 is preferably mounted on the substrate 11. By doing so, the metal plate 38 is sufficiently able to perform the function as the heat sink.

Although not illustrated, the metal plate 38 may be configured by at least one of the modulating electrodes 153, 154, 163, and 164. For example, the ground electrode 154 or 164 may perform the function of the metal plate 38. In this case, since it is possible to omit the additional step for producing the metal plate, it is possible to simplify the manufacturing process of the optical waveguide device 30.

Fourth Embodiment

Figure 5:
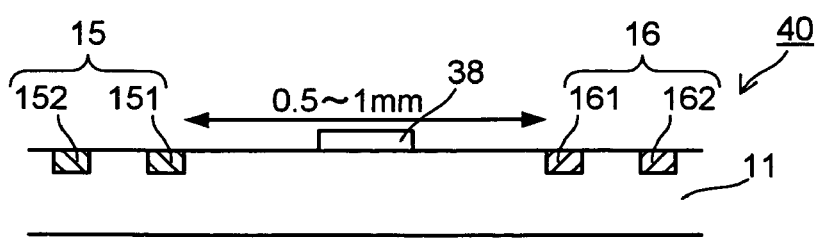
FIG. 5 is a cross-sectional view of an optical waveguide device according to a fourth embodiment.

FIG. 5 is a cross-sectional view of an optical waveguide device according to the fourth embodiment. The planar shape of the optical waveguide device of the present embodiment is identical to that in the first embodiment. FIG. 5 corresponds to FIG. 2 in the first embodiment, and is a cross-sectional view, taken on the A-A line, of the optical waveguide device. The same or similar components will be denoted by the same reference numerals.

The optical waveguide device 40 according to the present embodiment is different from that of the first embodiment, in that the heat conduction suppressing zone is configured differently; other components of the embodiments except this are completely the same, and the description thereof will be omitted.

As illustrated in FIG. 5, in the present embodiment, the metal plate 38 is provided between the first sub Mach-Zehnder type optical waveguide 15 and the second sub Mach-Zehnder type optical waveguide 16. Moreover, the first sub Mach-Zehnder type optical waveguide 15 and the second sub Mach-Zehnder type optical waveguide 16 are separated apart by a distance of 0.1 mm to 0.8 mm.

Therefore, since the distance between the optical waveguides is increased further, it is possible to reduce the inherent thermal interference between these optical waveguides, that is, the temperature crosstalk. Moreover, the metal plate 38 performs the function of a heat sink with respect to the heat generated between these optical waveguides, and thus, it is possible to effectively suppress the temperature crosstalk between these optical waveguides. As a result, it is possible to effectively suppress the effects of operating the point shifts due to the temperature crosstalk and other effects in the whole of the optical waveguide device 40.

In the present embodiment, the metal plate 38 is preferably mounted on the substrate 11. By doing so, the metal plate 38 is sufficiently able to perform the function as the heat sink.

Although not illustrated, the metal plate 38 may be configured by at least one of the modulating electrodes 153, 154, 163, and 164. For example, the ground electrode 154 or 164 may perform the function of the metal plate 38. In this case, since it is possible to omit the additional step for producing the metal plate, it is possible to simplify the manufacturing process of the optical waveguide device 40.

Examples

In the following examples, the optical waveguide devices according to the first to fourth embodiments were actually manufactured and the temperature crosstalks were examined.

Specifically, in the first embodiment, the distance between the first sub Mach-Zehnder type optical waveguide 15 and the second sub Mach-Zehnder type optical waveguide 16 was designed to 0.2 mm, and the trench having a depth of 0.2 mm and a width of 0.1 mm was formed between them (Example 1).

In the second embodiment, an epoxy resin was used for the heat insulating member. Moreover, the distance between the sub optical waveguides and the structure of the trench were the same as those in Example 1 (Example 2).

In the third embodiment, an Al plate having a width of 0.1 mm and a thickness of 10 μm was used for the metal plate. Moreover, the distance between the sub optical waveguides and the structure of the trench were the same as those in Example 1 (Example 3).

In Example 3, the distance between the sub optical waveguides was reduced to 0.1 mm (Example 4), and the distance between the sub optical waveguides was increased to 0.8 mm (Example 5).

For the above-mentioned cases, the degree of suppression for the temperature crosstalk was examined, and the examination results were evaluated by "O" and "X" depending on the level of the degree. The evaluation results are shown in Table 1. Specifically, "O" means that the thermal drift is 0.5 V or smaller, and "X" means that the thermal drift is larger than 0.5 V.

TABLE 1

| Countermeasures | Degree of suppression for Temperature Crosstalk |
| --- | --- |
| Example 1 | ⊚ |
| Example 2 | O |
| Example 3 | O |
| Example 4 | O |
| Example 5 | O |

As is obvious from Table 1, the temperature crosstalk was effectively suppressed in any of the cases. It was proven that the case where the heat insulating air layer was formed by the provision of the trench showed particularly excellent temperature crosstalk suppressing effect.

While the preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited.

What is claimed is:

1. An optical waveguide device comprising:
   a substrate having an electro-optical effect;
   an optical waveguide section formed on the substrate; and
   a plurality of modulating electrodes for modulating optical waves propagating in the optical waveguide section,
   wherein the optical waveguide section branches into two parts in a propagating direction of an optical wave, thus forming two main optical waveguides, and each of the main optical waveguides branches into two parts in the propagating direction of the optical waves, thus forming two sub optical waveguides; and wherein the two main optical waveguides constitute a main Mach-Zehnder type optical waveguide, and the two sub optical waveguides are incorporated into the main Mach-Zehnder type optical waveguide to constitute a sub Mach-Zehnder type optical waveguide so that a heat conduction suppressing zone is defined on a portion of the substrate disposed between two opposite sub Mach-Zehnder type optical waveguides.

2. The optical waveguide device according to claim 1, wherein the heat conduction suppressing zone is a trench formed inside the substrate.

3. The optical waveguide device according to claim 1, wherein the heat conduction suppressing zone is a heat insulating member which is filled in a trench formed inside the substrate.

4. The optical waveguide device according to claim 1, wherein the heat conduction suppressing zone is a metal plate.

5. The optical waveguide device according to claim 4, wherein the metal plate is at least one modulating electrode of the plurality of modulating electrodes, located between the two opposite sub Mach-Zehnder type optical waveguides.

6. A method for suppressing the temperature crosstalk of an optical waveguide device, the optical waveguide device comprising:

a substrate having an electro-optical effect;

an optical waveguide section formed on the substrate; and a plurality of modulating electrodes for modulating optical waves propagating in the optical waveguide section, wherein the optical waveguide section branches into two parts in a propagating direction of an optical wave, thus forming the two main optical waveguides, and each of the main optical waveguides branches into two parts in the propagating direction of the optical waves, thus forming the two sub optical waveguides; and the two main optical waveguides constitute a main Mach-Zehnder type optical waveguide, and the two sub optical waveguides are incorporated into the main Mach-Zehnder type optical waveguide to constitute a sub Mach-Zehnder type optical waveguide, the method comprising:

defining a heat conduction suppressing zone on a portion of the substrate disposed between the two opposite sub Mach-Zehnder type optical waveguides; and suppressing a occurrence of a temperature crosstalk between the two opposite sub Mach-Zehnder type optical waveguides.

7. The suppressing method of the optical waveguide device according to claim 6, wherein the heat conduction suppressing zone is a trench formed inside the substrate.

8. The suppressing method of the optical waveguide device according to claim 6, wherein the heat conduction suppressing zone is a heat insulating member which is filled in a trench formed inside the substrate.

9. The suppressing method of the optical waveguide device according to claim 6, wherein the heat conduction suppressing zone is a metal plate.

10. The suppressing method of the optical waveguide device according to claim 9, wherein the metal plate is at least one modulating electrode of the plurality of modulating electrodes, located between the two opposite sub Mach-Zehnder type optical waveguides.

* * * * *